United States Patent Office 2,842,888
Patented July 15, 1958

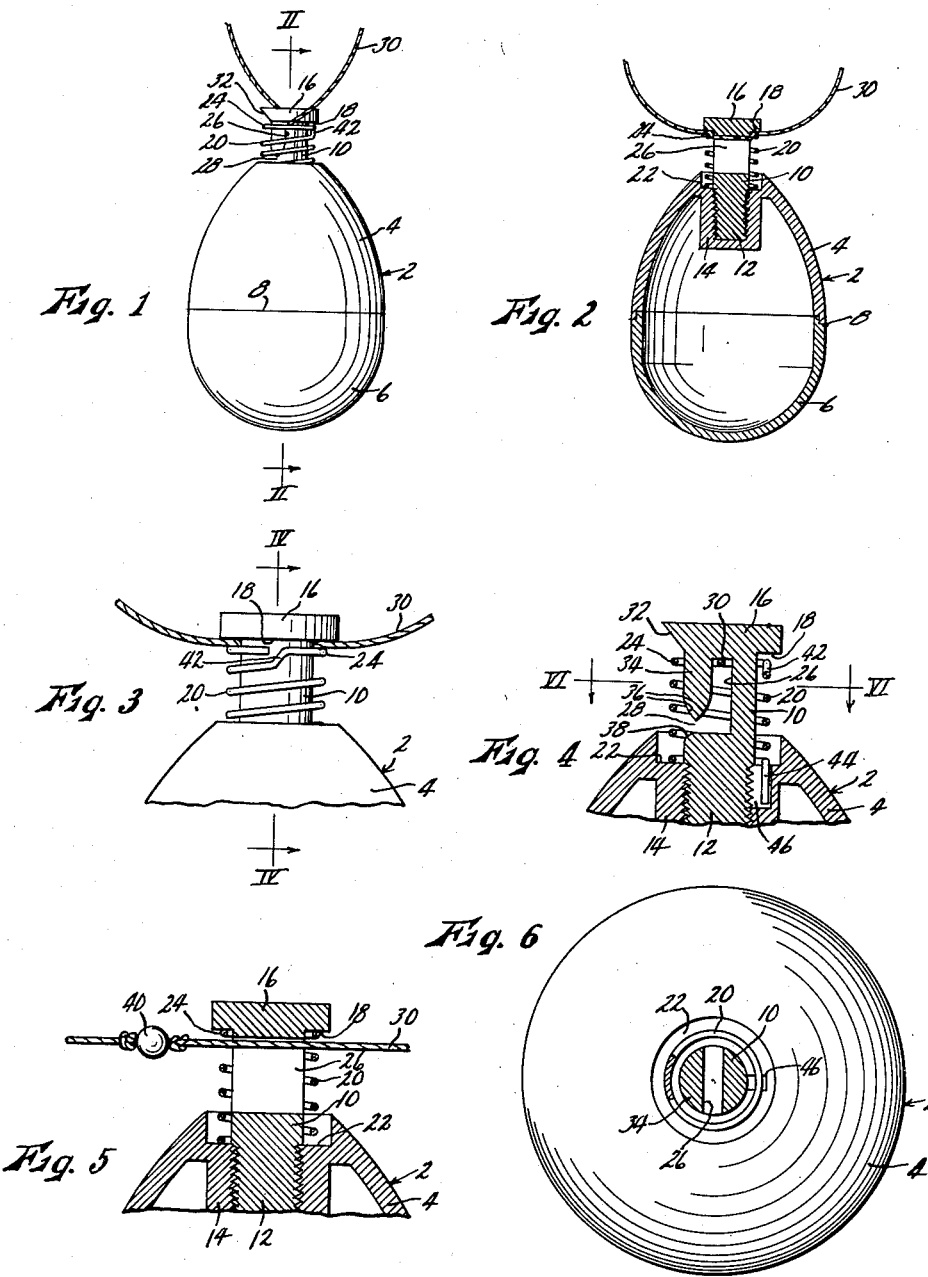

2,842,888
FISHING FLOAT

William F. Landrum, Kansas City, Kans.

Application March 12, 1956, Serial No. 571,065

2 Claims. (Cl. 43—44.95)

This invention relates to new and useful improvements in fishing floats or bobbers, and has as its principal object the provision of a float which may be alternatively either clamped frictionally on the fishing line, whereby to resist movement of the line therethrough, or attached loosely on said line, whereby said line may pass freely through the float. The former relationship is useful in "still" fishing, the fishing depth being controlled by the length of line disposed between the float and the hook or lure. The latter relationship is useful in casting, since it will be apparent that during the actual casting, the float will run outwardly on the line and rest against the lure, preventing whiplash and fouling of that portion of the line normally disposed between the float and the lure. When the float strikes water, the weight of the lure, or of the "sinker" attached thereto, will pull the line through the float until said lure is disposed at the desired fishing depth.

Another object is the provision of a fishing float of the character described which may be easily and quickly attached to or detached from any fishing line, and which may be freely adjusted along said line to any desired position.

Other objects are extreme simplicity, economy, and practicality of structure, dependability and efficiency of function, and ease and convenience of operation and use.

With these objects in view, as well as other objects which will appear in the course of the specification, reference will be had to the drawing, wherein:

Fig. 1 is a side elevational view of a fishing float embodying the present invention, showing a fishing line frictionally engaged therein, Fig. 2 is a sectional view taken on line II—II of Fig. 1, Fig. 3 is an enlarged, fragmentary right side view of the device as shown in Fig. 1, Fig. 4 is a sectional view taken on line IV—IV of Fig. 3, Fig. 5 is an enlarged fragmentary view similar to Fig. 2 but showing the fishing line engaged therein in a free-running relation, and Fig. 6 is a sectional view taken on line VI—VI of Fig. 4.

Like reference numerals apply to similar parts throughout the several views and the numeral 2 applies to a buoyant float body formed of plastic or other suitable material. It is hollow, being formed of two sections 4 and 6 cemented or otherwise joined together with a watertight seal at their juncture 8. As shown, said float body is substantially egg-shaped, although the specific form thereof is immaterial to the present invention.

Securely fixed in body section 4 is a cylindrical neck member 10 extending outwardly from said body member, said neck member being formed by a cylindrical rod, which may also be formed of plastic, having its inner end portion 12 threaded and screwed removably into a socket 14 formed integrally with body section 4. Neck 10 is provided at its outer end with an enlarged head 16, the face of which adjacent said neck forms a shoulder 18. Disposed about neck 10 is a helical compression spring 20, said spring normally bearing at one end against shoulder 18 and at its opposite end against a shoulder 22 countersunk in body section 4 around the neck. The topmost convolution 24 of said spring is disposed in a plane at right angles to the spring axis, whereby to bear evenly against shoulder 18. Formed in neck 10 is a diametric slot 26 extending longitudinally of said neck from a point approximately flush with the surface of body section 4 to a point adjacent but spaced below shoulder 18. A transverse slot 28 formed in said neck interconnects with the lower end of slot 26, and extends through the side of the neck, whereby access may be had to slot 26.

In use, a loop of the fishing line 30 is thrown around neck 10 at the upper end thereof, so that said loop enters between shoulder 18 and top convolution 24 of the spring. Head 16 is bevelled as at 32 to facilitate the insertion of the line between these members as described. Then, with the line loop held snugly against the neck, said loop is pulled downwardly along the neck compressing spring 20, until it enters through slot 28 into slot 26. Spring 20 is then allowed to recover, whereupon the line 30 is forced into the upper end of slot 26, and is clamped between shoulder 18 and the top convolution 24 of the spring, as best shown in Fig. 2. The line in this position is frictionally clamped in the float, as previously described for use in still fishing. The float may be adjusted along the line, whereby to control the fishing depth, but not without a substantial force being exerted thereon. The efficiency of the clamping action is materially enhanced by the fact that slot 26 terminates below shoulder 18. As shown in Fig. 2, this crimps line 30 in a double right-angled bend at each side of the neck, and greatly increases the force required to slide the line through the float. It will be apparent that for this purpose the internal diameter of spring 20 should be slightly larger than that of neck 10. When it is desired to detach the line from the float, portions of the line at opposite sides of the float are brought together to form a loop, and the loop is pulled downwardly against spring 20 until said loop can enter transverse slot 28.

As best shown in Fig. 4, it will be seen that the portion of neck 10 forming the forward wall of slot 26 and the upper wall of slot 28 constitutes a finger 34 projecting downwardly from head 16, and beneath which the line must pass when the float is being either attached to or detached from the line. The lower or free end portion of said finger has both the inner and outer surfaces bevelled, as indicated at 36 in Fig. 4. This bevelling facilitates the insertion and removal of the line, since the movement of the line along said bevelled portion creates a wedging action tending to compress spring 20 with less effort. The bevelling of the outer finger surface also reduces the undesirable possibility that a convolution of the spring might enter and be retained in the slots of the neck. In a similar manner, the portion of the neck 10 forming the lower wall of slot 28 is rounded at the slot entrance as indicated at 38, in order to prevent any spring convolution from hanging at that point.

If it is desired to attach the float to the line so that said line may run freely through the float, as previously described for use when casting, a loop of line 30 is passed around neck 10 between top convolution 24 of the spring and the next lower convolution of said spring, instead of between convolution 24 and shoulder 18. The loop is then pulled downwardly along neck 10, compressing the spring, until said loop passes through slot 28 into slot 26, and the spring then allowed to recover. The parts then have the position shown in Fig. 5, the line not being clamped against shoulder 18, but being retained in slot 26 solely by its loose retention between the convolutions of the spring. As previously set forth, when the float is cast, it will be urged against the fishing lure, or hook, by the force of the cast. When the float strikes the water, the lure will sink, pulling line 30 through the float until the desired fishing depth is reached. This depth may be fixed by attaching to line 30 a bead 40 or other enlargement which is too large to pass between the convolutions of spring 20. It is of course desirable, however, that enlargement 40 be small enough to pass through the line retaining eyes and reel mechanism of the fishing rod, in order not to interfere with the reeling in the line.

In order for the line to be free-running in the float as shown in Fig. 5, it is of course evident that the spacing between top convolution 24 and the next lower convolution of spring 20 must be greater than the thickness of line 30, to prevent binding of the line between these convolutions. Further, the spacing of these convolutions must exceed the line thickness by an amount at least equal to the spacing of the upper edge of slot 26 below shoulder 18, in order to prevent any possibility that the second convolution of the spring might force the line against the neck at the upper edge of slot 26. In order to assure this clearance between the convolutions, it will be seen in Fig. 3 that after top loop 24 of the spring is formed, the wire constituting the spring is offset sharply downwardly at 42, before entering on the next convolution. This offset is of course placed at a point distal from either end of slot 26, and the spring is retained against accidental rotation by the fact that it is provided at its lower end with an extension 44 (Fig. 4) engaged in a notch 46 formed in body shoulder 22.

It is believed apparent that neck 10 could be formed integrally with or permanently attached to body 2 if desired. However, its detachably threaded mounting in the body does permit ready removal thereof for replacement or repair of the neck or spring in the event these parts should become worn or damaged. It is considered that this as well as many other minor changes of structure and operation could be made without departing from the spirit of the invention as defined by the scope of the appended claims.

What I claim as new and desire to protect by Letters Patent is:

1. A fishing float comprising a buoyant body member, an elongated neck member affixed to and extending outwardly from said body member, said neck having a radially extending shoulder, a slot formed diametrically therethrough adjacent said shoulder, and a slot formed transversely therein, said transverse slot interconnecting with said diametric slot and extending through a side wall of said neck, and a helical compression spring encircling said neck and normally bearing against said shoulder, said transverse slot being spaced from said shoulder by a distance at least at great as the lead of said helical spring, whereby a fishing line extending through said diametric slot may be positioned selectively either between said shoulder and the end convolution of said spring, whereby it is gripped frictionally, or between successive convolutions of said spring, whereby it is retained in said slot but may run freely therethrough, the lead of said spring being greater than the thickness of said fishing line.

2. A structure as recited in claim 1 wherein the edge wall of said diametric slot adjacent said shoulder is spaced apart from said shoulder, and wherein the spacing between the end convolution and next successive convolution of said spring, at the ends of said diametric slot, is at least as great as the thickness of said fishing line plus the spacing of said diametric slot from said shoulder, and wherein the spacing of said transverse slot from said shoulder is at least as great as the spacing between the end convolution and the next successive convolution of said spring.

References Cited in the file of this patent

UNITED STATES PATENTS

| | | |
|---|---|---|
| 2,163,483 | Carlisle | June 20, 1939 |
| 2,255,793 | Kridler | Sept. 16, 1941 |
| 2,496,334 | Chapman | Feb. 7, 1950 |
| 2,560,129 | Rotehamel | July 10, 1951 |
| 2,680,322 | Schuermann | June 8, 1954 |